(12) United States Patent
Hirabayashi et al.

(10) Patent No.: US 7,537,838 B2
(45) Date of Patent: May 26, 2009

(54) HEAT FIXING ROLL AND FIXING BELT

(75) Inventors: Satao Hirabayashi, Annaka (JP); Mikio Iino, Annaka (JP); Nobumasa Tomizawa, Annaka (JP); Noriyuki Meguriya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 387 days.

(21) Appl. No.: 11/563,401

(22) Filed: Nov. 27, 2006

(65) Prior Publication Data

US 2007/0135555 A1    Jun. 14, 2007

(30) Foreign Application Priority Data

Nov. 28, 2005    (JP)    ............... 2005-341571

(51) Int. Cl.
*B32B 9/04*    (2006.01)
*C08L 83/04*    (2006.01)
*G03G 15/20*    (2006.01)

(52) U.S. Cl. ............... 428/450; 428/447; 428/421; 428/448; 524/439; 524/442; 524/588; 399/330; 399/331; 399/333; 492/56

(58) Field of Classification Search ............... None
See application file for complete search history.

(56) References Cited

U.S. PATENT DOCUMENTS 4,444,944 A    4/1984    Matsushita
5,011,870 A *  4/1991    Peterson ............... 523/220
2008/0080912 A1*  4/2008    Sawahata et al. ............ 399/333

FOREIGN PATENT DOCUMENTS

| EP | 0 609 038 A2 | 8/1994 |
|---|---|---|
| JP | 58-219259 | 12/1983 |
| JP | 3-221982 | 9/1991 |
| JP | 9-328365 | 12/1997 |
| JP | 10-39666 | 2/1998 |
| JP | 2000-63670 | 2/2000 |
| JP | 2000-89600 | 3/2000 |
| JP | 2002-270032 | 9/2002 |
| JP | 2003-137528 | 5/2003 |
| JP | 2003-208252 | 7/2003 |

* cited by examiner

*Primary Examiner*—Marc S Zimmer
(74) *Attorney, Agent, or Firm*—Oblon, Spivak, McClelland, Maier & Neustadt, P.C.

(57) ABSTRACT

A heat fixing roll or belt having a silicone rubber layer which is formed by curing a silicone rubber composition comprising (A) 100 pbw of an organopolysiloxane having at least two silicon-bonded alkenyl radicals in a molecule, (B) 20-500 pbw of a metallic silicon powder having an average particle size of up to 100 μm, and (C) an effective amount of a curing agent. The silicone rubber layer has a high heat conductivity and long-term temperature durability.

12 Claims, No Drawings

HEAT FIXING ROLL AND FIXING BELT

CROSS-REFERENCE TO RELATED APPLICATION

This non-provisional application claims priority under 35 U.S.C. §119(a) on Patent Application No. 2005-341571 filed in Japan on Nov. 28, 2005, the entire contents of which are hereby incorporated by reference.

TECHNICAL FIELD

This invention relates to a heat fixing roll or belt comprising a silicone rubber layer which is obtained by curing a heat-curable (especially, addition reaction curable or organic peroxide curable) highly heat conductive silicone rubber composition and has a high thermal conductivity and undergoes little changes of physical properties upon exposure to elevated temperature.

BACKGROUND ART

Due to excellent electrical insulation, heat resistance, weather resistance and flame retardance, silicone rubber is used in a wide variety of applications including electric and electronic equipment (such as domestic appliances and computers), transportation vehicles, business machines, and buildings. Particularly in the latest decade, silicone rubber is used as coatings on heat sinks in computers and fixing rolls like heating rolls and pressure rolls in copiers and laser printers. To comply with higher speed copiers and color copiers which are recently on wide-spreading use, fixing rolls are required to have lower hardness. Prior art metal materials and fluororesins fail to meet such requirements, and rolls of the type in which fluororesin is coated over heat conductive silicone rubber are often employed. In particular, the rubber used in heating rolls is required to have a high thermal conductivity from the standpoints of reducing the waiting time upon startup of the machine and saving the energy consumed by the machine itself. A low compression set is also required because the rubber is always exposed to high temperatures of 150 to 250° C. However, since silicone rubber itself is not so heat conductive, fillers having a high thermal conductivity are generally added. Such filled silicone rubber compositions are disclosed, for example, in JP-A 58-219259 corresponding to U.S. Pat. No. 4,444,944, JP-A 3-221982 and JP-A 10-39666. In these compositions, silica, alumina, magnesium oxide and the like are added to ordinary silicone rubbers as the heat conductive filler. These fillers, however, must be loaded in large amounts in order to improve heat conductivity. Heavy loading of fillers adversely affects the compression set of rubber which is requisite as rubber rollers, and gives rise to detrimental problems including degraded heat resistance, increased roll hardness, and difficulty of molding.

SUMMARY OF THE INVENTION

An object of the invention is to provide a heat fixing roll or belt comprising a silicone rubber layer which has adequate thermal conductivity, heat resistance, and modulus of elasticity.

Seeking for a material having a high thermal conductivity and satisfactory heat resistance, the inventor has found that a cured silicone rubber having a high thermal conductivity, a low compression set, and satisfactory heat resistance is obtainable by incorporating a metallic silicon powder into a silicone rubber composition and curing the composition. The high level of thermal conductivity and heat resistance allows the silicone rubber to find use as coatings on fixing rolls and belts in copiers and printers.

With respect to the use of fillers such as metallic silicon powder for thermal conduction improvements, JP-A 2002-270032 describes the use of carbon powder in combination with SiOx (wherein 0.5<x<1.5) powder for imparting electrical conduction, but does not refer to metallic silicon powder and heat conduction. JP-A 2000-089600 and JP-A 2003-208252 describe the use of silicon carbide as a heat conductive material, but do not refer to metallic silicon powder. JP-A 9-328365 and JP-A 2003-137528 describe to utilize metallic silicon as the starting material toward silicon nitride and spherical silica, but do not indicate that metallic silicon powder is incorporated into organopolysiloxane for the thermal conduction improving purpose as in the present invention, for thereby forming highly heat conductive silicone rubber.

In one aspect, the invention provides a fixing roll comprising a roll shaft and at least one silicone rubber layer surrounding the outer periphery of the shaft; or a fixing roll comprising a roll shaft, at least one silicone rubber layer surrounding the outer periphery of the shaft, and a fluororesin or fluororubber layer surrounding the silicone rubber layer; or a fixing belt comprising a belt substrate, at least one silicone rubber layer disposed on the substrate, and optionally a fluororesin or fluororubber layer disposed on the silicone rubber layer. In these heat fixing rolls or belts, the silicone rubber layer is formed by curing a highly heat conductive silicone rubber composition comprising (A) 100 parts by weight of an organopolysiloxane having at least two silicon-bonded alkenyl radicals in a molecule, (B) 20 to 500 parts by weight of a metallic silicon powder having an average particle size of up to 100 μm, and (C) a sufficient amount for component (A) to cure of a curing agent.

In one preferred embodiment, the metallic silicon powder (B) is a ground metallic silicon powder powdered by a grinding method to an average particle size of 1 to 50 μm, or a spherical metallic silicon powder having an average particle size of 1 to 50 μm. Also preferably, the silicone rubber layer has a thermal conductivity of at least 0.5 W/mK in the cured state.

The silicone rubber compositions of the invention cure into products having not only a high thermal conductivity, but also satisfactory heat resistance. Then fixing rolls or belts using the same are highly thermally conductive and remain durable during long-term service at elevated temperature.

DESCRIPTION OF THE PREFERRED EMBODIMENT

Component (A) of the heat conductive silicone rubber composition for heat fixing rolls or belts according to the invention is a diorganopolysiloxane having at least two silicon atom-bonded alkenyl radicals in a molecule which is liquid or gum-like at room temperature. The alkenyl-containing organopolysiloxane used herein is preferably of the average compositional formula (1).

$$R^1_a SiO_{(4-a)/2} \tag{1}$$

Herein $R^1$, which may be the same or different, is a substituted or unsubstituted monovalent hydrocarbon radical of 1 to 10 carbon atoms, preferably 1 to 8 carbon atoms, and "a" is a positive number in the range of 1.5 to 2.8, preferably 1.8 to 2.5.

Examples of the substituted or unsubstituted monovalent hydrocarbon radical attached to a silicon atom represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted forms of the foregoing radicals in which some or all of the hydrogen atoms are substituted by halogen atoms (e.g., fluorine, bromine and chlorine), cyano radicals or the like, such as chloromethyl, chloropropyl, bromoethyl, trifluoropropyl and cyanoethyl. It is preferred that at least 90 mol % of all $R^1$ radicals be methyl.

At least two of $R^1$ radicals must be alkenyl radicals, preferably having 2 to 8 carbon atoms, more preferably 2 to 6 carbon atoms, most preferably vinyl. It is preferred that the content of alkenyl radicals be $1.0 \times 10^{-6}$ to $5.0 \times 10^{-3}$ mol/g of the organopolysiloxane, especially $5.0 \times 10^{-6}$ to $1.0 \times 10^{-3}$ mol/g. An alkenyl content of less than $1.0 \times 10^{-6}$ mol/g may invite insufficient crosslinking, resulting in a gel-like material. An alkenyl content of more than $5.0 \times 10^{-3}$ mol/g may lead to too high a crosslinking density, with the resulting rubber becoming brittle. The alkenyl radicals may be attached to the silicon atoms at the ends of the molecular chain or silicon atoms intermediate the molecular chain or both. With respect to the molecular weight, the organopolysiloxane is liquid or gum-like at room temperature, and thus preferably has a degree of polymerization in the range of 50 to 50,000, more preferably 80 to 20,000.

With respect to the structure, the organopolysiloxane has a generally straight chain structure whose backbone is comprised of recurring diorganosiloxane ($R^1_2SiO_{2/2}$) units (e.g., dimethylsiloxane, diphenylsiloxane, methylphenylsiloxane, methyltrifluoropropylsiloxane, vinylmethylsiloxane units) and which is blocked with a triorganosiloxy ($R^1_3SiO_{1/2}$) radical (e.g., trimethylsiloxy, vinyldimethylsiloxy, divinylmethylsiloxy, trivinylsiloxy, vinyldiphenylsiloxy, vinylmethylphenylsiloxy, phenyldimethylsiloxy, diphenylmethylsiloxy radicals) at each end of the molecular chain. However, it may have a partially branched or cyclic structure.

Component (B) is a highly heat conductive inorganic powder for imparting heat conductivity to silicone rubber compositions. The silicone rubber composition of the invention is arrived at by compounding (A) the organopolysiloxane described above with (B) a metallic silicon powder as the highly heat conductive inorganic powder. Metallic silicon has good heat conductivity, a low Mohs hardness, and easy shattering by buffeting and low malleability due to its metallic silicon nature, and is characterized in that a metal powder is unlikely to agglomerate even when high shear forces are applied. For this reason, metallic silicon is easy to atomize or powder by grinding, and effectively dispersible in organopolysiloxanes. In addition, metallic silicon particles have on their surface a very thin spontaneous oxide film, which is resistant to heat, acid and stain like glass, and prevents electricity conduction and remains stable to heat.

The metallic silicon powder used herein may be prepared by any desired method. Included are metallic silicon powders obtained by a grinding method, for example, a powder obtained by chemically reducing silica into metallic silicon and grinding it in an existing crusher or grinding machine such as a ball mill, and a powder obtained by using as raw material metallic silicon (wafer) fragments and chips resulting from the semiconductor manufacturing process and finely dividing the material; and a spherical metallic silicon powder obtained by melting metallic silicon at high temperature, atomizing the molten silicon in a vapor phase, followed by cooling and solidification into spherical particles. As used herein, the term "spherical" means that particles are free of pointed edges on their surfaces and have a smooth contour, typically having an aspect ratio (length/breadth) between 1.0 and 1.4, preferably between 1.0 and 1.2. Metallic silicon may have either a single crystal or a polycrystalline structure. Although the purity of metallic silicon powder as atomized is not particularly limited, it is desired from the standpoint of imparting heat conductivity to have a purity of at least 50% (i.e., 50 to 100%), more preferably at least 80% (i.e., 80 to 100%), and even more preferably at least 95% (i.e., 95 to 100%). Metallic silicon powder of a higher purity has a surface spontaneous oxide film which is defect-free, offering better thermal stability at high temperature.

The metallic silicon powder used herein should have an average particle size of up to 100 μm, preferably 1 to 50 μm, more preferably 1 to 25 μm, and most preferably 2 to 25 μm. Particles with an average particle size less than 1 μm are difficult to prepare and may be difficult to incorporate in large amounts whereas particles with an average particle size more than 100 μm can detract from the mechanical strength of cured rubber and compromise roll surface properties.

It is noted that the average particle size is determined as a cumulative weight average value $D_{50}$ or median diameter in particle size distribution measurement by the laser light diffraction method.

The metallic silicon powder used as component (B) may be treated with suitable surface treating agents for the purpose of improving the dispersibility of the powder in a silicone rubber composition and the thermal stability of the silicone rubber composition. Suitable surface treating agents include silane coupling agents and partial hydrolyzates thereof, alkylalkoxysilanes and partial hydrolyzates thereof, organic silazanes, titanate coupling agents, organopolysiloxane oils, and hydrolyzable functional radical-bearing organopolysiloxanes. With respect to the time of surface treatment, the inorganic powder may be treated previously or at the time of mixing with the organopolysiloxane (A).

The amount of metallic silicon powder (B) blended is 20 to 500 parts by weight, preferably 50 to 300 parts by weight per 100 parts by weight of component (A). Less than 20 pbw of the metallic silicon powder fails to achieve a high thermal conductivity whereas more than 500 pbw substantially degrades rubber physical properties like strength.

In the silicone rubber composition of the invention, an additional heat conductive substance may be used together as long as it does not adversely affect low compression set and heat resistance. In such a case, the metallic silicon powder should account for at least 50% by volume of the entire heat conductive substances. The additional heat conductive substance is not particularly limited and may be any of existing substances. Suitable examples include alumina, aluminum, silicon carbide, silicon nitride, magnesium oxide, magnesium carbonate, zinc oxide, aluminum nitride, graphite, and fibrous graphite.

Component (C) is a curing agent which may be either an addition reaction curing agent or an organic peroxide curing agent, as is well known in the art.

The addition reaction curing agent is a combination of (C-1) an organohydrogenpolysiloxane and (C-2) an addition reaction catalyst.

The organohydrogenpolysiloxane (C-1) serves as a crosslinker for causing the composition to cure through hydrosilylating addition reaction with the alkenyl-containing organopolysiloxane (A). Typically the organohydrogenpolysiloxane has the following average compositional formula (2):

$$R^2{}_b H_c SiO_{(4-b-c)/2} \quad (2)$$

wherein $R^2$ is a substituted or unsubstituted monovalent hydrocarbon radical of 1 to 10 carbon atoms, the letter b is a positive number of 0.7 to 2.1, preferably 0.8 to 2.0, c is a positive number of 0.001 to 1.0, and b+c is 0.8 to 3.0, preferably 1.0 to 2.5. The organohydrogenpolysiloxane should have at least 2, preferably at least 3 (ordinarily 3 to about 200), more preferably 3 to 100, most preferably 3 to 50 silicon-bonded hydrogen atoms (i.e., SiH radicals) in a molecule. The hydrogen atoms may be attached to the silicon atoms at ends of the molecular chain and/or silicon atoms midway the molecular chain.

Herein $R^2$ is a substituted or unsubstituted monovalent hydrocarbon radical, examples of which are as described for $R^1$ in formula (1), and preferably those free of aliphatic unsaturation (like alkenyl).

Exemplary organohydrogenpolysiloxanes include tris(dimethylhydrogensiloxy)methylsilane, tris(dimethylhydrogensiloxy)phenylsilane, 1,1,3,3-tetramethyldisiloxane, 1,3,5,7-tetramethylcyclotetrasiloxane, methylhydrogencyclopolysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units, and substituted forms of the foregoing in which some or all methyl radicals are substituted by different alkyl radicals (e.g., ethyl, propyl), aryl radicals (e.g., phenyl), or halo-substituted alkyl radicals (e.g., 3,3,3-trifluoropropyl).

The molecular structure of the organohydrogenpolysiloxane may be linear, cyclic or branched, or three-dimensional network structure while the number of silicon atoms per molecule, that is, the degree of polymerization is 2 to about 1,000, preferably 3 to about 500, more preferably 3 to about 300, and most preferably 4 to about 150.

The organohydrogenpolysiloxane (C-1) is preferably blended in an amount of 0.1 to 50 parts, more preferably 0.3 to 30 parts, even more preferably 0.3 to 30 parts, and most preferably 0.3 to 20 parts by weight per 100 parts by weight of the organopolysiloxane (A). Differently stated, the organohydrogenpolysiloxane (C-1) may be blended in such amounts that the molar ratio of silicon-bonded hydrogen atoms (SiH radicals) in component (C-1) to silicon-bonded alkenyl radicals in component (A) is from 0.5 to 5 mol/mol, preferably from 0.8 to 4 mol/mol, and more preferably from 1 to 3 mol/mol.

The addition reaction catalyst (C-2) is to promote hydrosilylating addition reaction between silicon-bonded alkenyl radicals in component (A) and SiH radicals in component (C-1). Typical addition reaction catalysts are platinum group metal catalysts including platinum catalysts, for example, platinum black, platinic chloride, chloroplatinic acid, reaction products of chloroplatinic acid with monohydric alcohols, complexes of chloroplatinic acid with olefins, and platinum bisacetoacetate; palladium catalysts; and rhodium catalysts. The addition reaction catalyst is used in a catalytic amount, typically about 0.5 to 1,000 parts, preferably about 1 to 500 parts by weight of platinum group metal per million parts by weight of components (A) and (C-1) combined.

The organic peroxide (C-3) used herein may be selected from well-known peroxides which are used in conventional peroxide cure type organopolysiloxane compositions as a catalyst for promoting crosslinking reaction of organopolysiloxane (A). Examples include, but are not limited to, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)-hexane, di-t-butyl peroxide, t-butyl perbenzoate, and 1,1-bis(t-butylperoxycarboxy)hexane.

The organic peroxide is used in a catalytic amount for causing the organopolysiloxane to cure. Although the amount of peroxide may be determined appropriate in accordance with the desired cure rate, it is usually 0.1 to 10 parts, preferably 0.2 to 2 parts by weight per 100 parts by weight of component (A).

Also contemplated herein is the combined use of the addition crosslinking and organic peroxide crosslinking. In curing of liquid organopolysiloxane compositions, addition crosslinking is recommended.

Optionally, an electrically conductive material is added to the silicone rubber composition of the invention to render it electrically conductive. Although the type and amount of electroconductive material used are not particularly limited, use may be made of electroconductive carbon black, electroconductive zinc white, metal powder or the like, alone or in admixture of two or more.

The carbon black used herein may be selected from those customarily used in conventional electroconductive rubber compositions, and examples include acetylene black, conductive furnace black (CF), super-conductive furnace black (SCF), extra-conductive furnace black (XCF), conductive channel black (CC), and furnace black and channel black which have been heat treated at elevated temperatures of about 1,500 to 3,000° C. Specific examples include acetylene blacks sold under the trade name of Denka Acetylene Black from Denki Kagaku Kogyo K.K. and Shawnigan Acetylene Black from Shawnigan Chemical Co.; conductive furnace blacks sold under the trade name of Continex CF from Continental Carbon and Vulcan C from Cabot Corp.; super-conductive furnace blacks sold under the trade name of Continex SCF from Continental Carbon and Vulcan SC from Cabot Corp.; extra-conductive furnace blacks sold under the trade name of Asahi HS-500 from Asahi Carbon Co., Ltd. and Vulcan XC-72 from Cabot Corp.; and conductive channel black sold under the trade name of Corax L from Degussa AG. Ketjen Black EC and Ketjen Black EC-600JD (Ketjen Black International) which belong to a class of furnace black are also useful. The furnace black should desirably contain impurities in a low concentration, specifically sulfur and sulfur compounds in a concentration equal to or less than 6,000 ppm, more preferably equal to or less than 3,000 ppm of elemental sulfur. Of these carbon blacks, acetylene black is more electroconductive because of a low impurity content and a well developed secondary structure, and thus especially suited for use herein.

The electroconductive material may be added in such amounts that the resulting silicone rubber composition has an electrical resistance sufficient to render the rubber electroconductive, specifically a volume resistivity equal to or less than $10^{14}$ Ω-m. Preferably, the electroconductive material is added in an amount of 1 to 50 parts, more preferably 5 to 20 parts by weight per 100 parts by weight of component (A). Less than 1 pbw of the electroconductive material may fail to provide the desired electrical conductivity whereas more than 100 pbw of the electroconductive material may interfere with physical mixing and detract from mechanical strength, failing to achieve the desired rubber elasticity.

In the silicone rubber composition of the invention, there may be further admixed finely divided silica such as fumed silica, precipitated silica, fused silica, fired silica, spherical silica by the sol-gel method, crystalline silica (quartz flour), and diatomaceous earth (inter alia, fused silica and crystalline silica also serving as the additional heat conductive substance); reinforcing or semi-reinforcing fillers such as calcium carbonate, clay, diatomaceous earth, and titanium dioxide; reinforcements such as silicone resins; hydrosilylation reaction regulators such as nitrogen-containing compounds, acetylene compounds, phosphorus compounds, nitrile compounds, carboxylates, tin compounds, mercury compounds, and sulfur compounds; heat resistance modifiers such as iron oxide and cerium oxide; internal parting agents such as dimethylsilicone oil; tackifiers; thixotropic agents; and the like. These additives may be incorporated insofar as they do not compromise the objects of the invention. Besides, heat resistance improvers such as iron oxide, cerium oxide and iron octylate, various carbon-functional silanes for improving adhesion and molding, and nitrogen compounds and halogen compounds for imparting flame retardance may also be admixed. Low molecular weight siloxane having a degree of polymerization of up to 100, silanol-containing silanes, and alkoxy-containing silanes may also be added as a dispersing agent.

Admixing of the heat conductive inorganic powder may be carried out by mixing components (A) and (B) together on a mixing machine such as a planetary mixer or kneader at room temperature or while heating at a high temperature of 100 to 200° C. Where heat treatment is involved, a composition may be prepared by premixing component (A) with component (B), finely divided silica filler and the like to form a base compound, admixing various additives and powder carbon black in the base compound similarly on a milling machine, and optionally further adding and admixing a curing agent.

The silicone rubber composition of the invention may be shaped into a part desired in a particular application by various ordinary silicone shaping methods including liquid injection molding (LIM) and mold compression molding. The molding conditions are not particularly limited and preferably include a temperature of 100 to 400° C. and a time of several seconds to 1 hour. The molding step may be followed by post-curing or secondary vulcanization, preferably at 150 to 250° C. for 1 to 30 hours.

According to the invention, a fixing roll is constructed by forming a highly heat conductive cured layer, (i.e., silicone rubber layer) of the inventive silicone rubber composition on a metal shaft. The material and size of the metal shaft may be suitably selected in accordance with the type of a desired roll. The shaft may be made of aluminum, steel or stainless steel. It is preferred that the surface of the shaft is treated with a primer such as a silane coupling agent or silicone adhesive in order to allow the shaft to firmly adhere to the silicone rubber layer.

The method of shaping and curing the silicone rubber composition may be appropriately selected. For example, the composition may be shaped by any of casting, transfer molding, injection molding and coating methods and cured by heating. The silicone rubber layer formed by curing the silicone rubber composition may be a single layer or two or more layers in which the amounts of the metallic silicon powders of component (B) are different each other. The total thickness of the silicone rubber layer is preferably 50 µm to 20 mm, more preferably 0.2 mm to 6 mm. Too thin layer may not exert a sufficient rubber elasticity. Too thick layer may injure heat transfer property between the metal shaft and the surface of the fixing roll.

A fluororesin layer or fluororubber layer may be formed on the outer surface of the silicone rubber layer. In this embodiment, the fluororesin layer is formed of a fluororesin coating material or fluororesin tubing so that it encloses or covers the silicone rubber layer. The fluororesin coating materials include, for example, polytetrafluoroethylene resin (PTFE) latexes, and DAI-EL latexes (fluorochemical latexes by Daikin Industries, Ltd.). The fluororesin tubing is commercially available, and examples include polytetrafluoroethylene resins (PTFE), tetrafluoroethylene-perfluoroalkyl vinyl ether copolymer resins (PFA), fluorinated ethylene-propylene copolymer resins (FEP), polyvinylidene fluoride resins (PVDF), and polyvinyl fluoride resins. Inter alia, PFA is preferred.

The thickness of the fluororesin or fluororubber layer is preferably 1 µm to 500 µm, more preferably 10 µm to 300 µm. Too thin layer may cause rupture, wrinkle or peeling of the layer when the roll is stressed externally. Too thick layer may injure the rubber elasticity of the roll and cause crack, break or like appearance failure.

A fixing belt is constructed by forming the silicone rubber layer on a belt body. The belt body may be composed of the known material such as a metal belt including nickel electroforming, stainless steel and aluminum or an organic resin film including polyimide resin, polyamide resin and polyamide-imide resin. The shape and size of the belt body may be suitably selected in accordance with the type of a desired belt.

The method of shaping and curing the silicone rubber composition may be the same as in the fixing roll. The silicone rubber layer formed on the fixing belt may be a single layer or two or more layers in which the amounts of the metallic silicon powders of component (B) are different each other. The total thickness of the silicone rubber layer is preferably 50 µm to 5 mm, more preferably 100 µm to 1 mm. Too thin layer may not exert a sufficient rubber elasticity. Too thick layer may injure heat transfer property between the belt body and the surface of the fixing belt.

A fluororesin layer or fluororubber layer also may be formed on the silicone rubber layer. The fluororesin and fluororubber materials are the same as in the fixing roll. The thickness of the fluororesin or fluororubber layer is preferably 1 µm to 300 µm, more preferably 2 µm to 100 µm. Too thin layer may cause rupture, wrinkle or peeling of the layer when the belt is stressed externally. Too thick layer may injure the rubber elasticity of the roll and cause crack, break or like appearance failure.

A cured layer of the highly heat conductive silicone rubber composition (i.e., the silicone rubber layer) preferably has a thermal conductivity of at least 0.5 W/mK, more preferably 0.5 to 4.0 W/mK, and even more preferably 0.5 to 2.5 W/mK.

EXAMPLE

Examples of the invention are given below by way of illustration and not by way of limitation. All parts are by weight.

Example 1

A planetary mixer was charged with 60 parts of a dimethylpolysiloxane capped with dimethylvinylsiloxy radicals at both ends (degree of polymerization 500), 1 part of hydrophobized fumed silica having a specific surface area of 110 m²/g (R-972 by Nippon Aerosil Co., Ltd.), 2 parts of iron oxide ($Fe_2O_3$) having an average particle size of 0.10 μm, and 160 parts of ground metallic silicon powder A having an average particle size of 5 μm, which were agitated at room temperature (23° C.) for two hours. The mixture was milled on a three roll mill for dispersing the fillers, after which it was fed back to the planetary mixer. To the mixture were added 40 parts of a dimethylpolysiloxane capped with trimethylsiloxy radicals at both ends and having vinyl radicals on side chains (degree of polymerization 300, vinyl value 0.000075 mol/g), 1.0 part of methylhydrogenpolysiloxane having Si—H radicals at both ends and side chains (degree of polymerization 17, Si—H content 0.0038 mol/g), 0.05 part of ethynyl cyclohexanol as a reaction regulator, and 0.1 part of a platinum catalyst (Pt concentration 1 wt %). Agitation was continued for 15 minutes to finish a silicone rubber composition (EX1).

This silicone rubber composition (EX1) was press cured at 120° C. for 10 minutes and oven cured at 200° C. for 4 hours. The cured sample was measured for hardness and compression set after 180° C./22 hours according to JIS K6249. A similarly cured sheet of 12 mm thick was measured for thermal conductivity by means of a thermal conductivity meter QTM-3 (Kyoto Electronic Co., Ltd.).

The sample was allowed to stand in an oven at 230° C. for 144 hours, after which its hardness was measured again to see whether or not it was thermally degraded. The results are shown in Table 1.

Example 2

A silicone rubber composition (EX2) was prepared as in Example 1 aside from compounding 250 parts of ground metallic silicon powder B having an average particle size of 12 μm instead of 160 parts of ground metallic silicon powder A. Similarly, samples were prepared from the composition and tested.

Example 3

A silicone rubber composition (EX3) was prepared as in Example 1 aside from compounding 120 parts of ground metallic silicon powder B having an average particle size of 12 μm and 90 parts of spherical alumina having an average particle size of 12 μm instead of 160 parts of ground metallic silicon powder A. Similarly, samples were prepared from the composition and tested.

Example 4

A silicone rubber composition (EX4) was prepared as in Example 1 aside from compounding 260 parts of spherical metallic silicon powder C having an average particle size of 5 μm instead of 160 parts of ground metallic silicon powder A. Similarly, samples were prepared from the composition and tested.

Example 5

In a pressure kneader, 100 parts of an organopolysiloxane consisting essentially of 99.825 mol % dimethylsiloxane units and 0.15 mol % methylvinylsiloxane units, end-capped with 0.025 mol % dimethylvinylsilyl radicals and having a viscosity of $1 \times 10^7$ mm²/S was kneaded with 12 parts of acetylene black under the trade name: Denka Black (average particle size 40 μm, by Denki Kagaku Kogyo K.K.), 3 parts of fumed silica having a specific surface area of 200 m²/g (Nippon Aerosil Co., Ltd.), 2 parts of a silanol end-capped dimethylpolysiloxane polymer having an average degree of polymerization of 3 to 10 as a dispersant, and 155 parts of ground metallic silicon powder A having an average particle size of 5 μm as a heat conductive filler. To 100 parts of the resulting base compound was added 2 parts of a 25% silicone paste of 2,5-dimethyl-bis(2,5-t-butylperoxy)-hexane as a curing agent. Further kneading yielded a silicone rubber composition.

This silicone rubber composition (EX5) was press cured at 165° C. for 10 minutes and oven cured at 200° C. for 4 hours. The cured sample was measured for hardness and compression set after 180° C./22 hours according to JIS K6249 as well as thermal conductivity and volume resistivity. The sample was allowed to stand in an oven at 230° C. for 144 hours, after which its hardness was measured again to see whether or not it was thermally degraded.

Comparative Example 1

An experiment was carried out by following the formulation of Example 1 and compounding an amount of quartz flour having an average particle size of 5 μm instead of 160 parts of ground metallic silicon powder A. With an intention to achieve a heat conductivity equivalent to that of Example 1, an attempt was made to increase the amount of quartz flour to 250 parts, but failed to compound an amount of 200 parts or more.

Comparative Example 2

A silicone rubber composition (CE2) was prepared as in Example 1 aside from compounding 260 parts of granular alumina powder having an average particle size of 5 μm instead of 160 parts of ground metallic silicon powder A. Similarly, samples were prepared from the composition and tested.

Comparative Example 3

A silicone rubber composition (CE3) was prepared as in Example 2 aside from compounding 500 parts of spherical alumina powder having an average particle size of 12 μm instead of 250 parts of ground metallic silicon powder B. Similarly, samples were prepared from the composition and tested.

Comparative Example 4

A silicone rubber composition was prepared as in Example 1 aside from compounding 320 parts of spherical alumina powder having an average particle size of 16 μm instead of 160 parts of ground metallic silicon powder A. Similarly, samples were prepared from the composition and tested.

Comparative Example 5

A silicone rubber composition was prepared as in Example 1 aside from compounding 280 parts of spherical alumina powder having an average particle size of 5 μm instead of 160 parts of ground metallic silicon powder A. Similarly, samples were prepared from the composition and tested.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Hardness (Durometer A) | 36 | 43 | 33 | 40 | 65 | — | 31 | 40 | 35 | 40 |
| Hardness (Durometer A) after 230° C. × 144 hr | 37 | 45 | 37 | 42 | 62 | — | 42 | 55 | 45 | 65 |
| Compression set (%) @ 180° C./22 hr | 5 | 7 | 9 | 6 | 11 | — | 18 | 25 | 20 | 90 |
| Thermal conductivity (W/mK) | 0.80 | 1.20 | 0.80 | 1.20 | 0.85 | — | 0.79 | 1.19 | 0.80 | 1.20 |
| Volume resistivity (Ω-m) | — | — | — | — | 12 | — | — | — | — | — |

Example 6

Onto the surface of an aluminum shaft having a diameter of 12 mm and a length of 300 mm, Primer No. 101A/B for addition reaction type liquid silicone rubber (Shin-Etsu Chemical Co., Ltd.) was applied. The primed aluminum shaft was fixedly set in a mold, which was filled with silicone rubber composition (EX1) of Example 1 under a pressure of 10 kgf/cm². The composition was heat cured at 150° C. for 30 minutes and post-cured at 200° C. for 4 hours, completing a silicone rubber-made fixing roll having a thickness of 2 mm of the silicone rubber layer and an outer diameter of 16 mm.

This fixing roll was mounted in an electrophotographic copier which was continuously operated to produce 50,000 A4-size plain paper copies. Neither paper wrinkles or clogging took place. All the images copied were clear.

Comparative Example 6

A fixing roll was prepared as in Example 6 except that silicone rubber composition (CE2) of Comparative Example 2 was used instead of silicone rubber composition (EX1). This fixing roll was mounted in an electrophotographic copier which was continuously operated to produce A4-size plain paper copies. The image became vague after 25,000 copies. A visual observation of the roll revealed roll breakage, that is, the silicone rubber layer was broken.

Example 7

Onto the surface of an aluminum shaft having a diameter of 12 mm and a length of 300 mm, Primer No. 101A/B for addition reaction type liquid silicone rubber (Shin-Etsu Chemical Co., Ltd.) was applied. The primed aluminum shaft was inserted into a fluororesin PFA tube of 50 μm gage whose inner surface had been primed. Silicone rubber composition (EX2) of Example 2 was fed between the tube and the shaft under a pressure of 5 kgf/cm². The composition was heat cured at 150° C. for 30 minutes and post-cured at 200° C. for 4 hours, completing a PFA resin-covered, silicone rubber-made fixing roll having an outer diameter of 20 mm and a length of 250 mm.

This fixing roll was mounted in an electrophotographic copier which was continuously operated to produce 50,000 A4-size plain paper copies. Neither paper wrinkles or clogging took place. All the images copied were clear.

Comparative Example 7

A fixing roll was prepared as in Example 7 except that silicone rubber composition (CE3) of Comparative Example 3 was used instead of silicone rubber composition (EX2). This fixing roll was mounted in an electrophotographic copier which was continuously operated to produce A4-size plain paper copies. The image became vague after 30,000 copies. A visual observation of the roll revealed that the roll was deformed at the edges.

Example 8

Onto the outer peripheral surface of a belt substrate of nickel (gage 50 μm, inner diameter 55 mm, width 250 mm), Primer No. 101A/B for addition reaction type liquid silicone rubber (Shin-Etsu Chemical Co., Ltd.) was applied, dried and baked at 150° C. for 15 minutes. Onto the primed surface, silicone rubber composition (EX1) of Example 1 was coated to a thickness of about 300 μm, heat cured at 150° C. for 15 minutes and post-cured at 200° C. for 2 hours. Onto the surface of the cured silicone rubber, primer GLP-103SR for DAI-EL latex and silicone rubber (Daikin Industries, Ltd.) was evenly coated and heated at 80° C. for 10 minutes. Then DAI-EL latex GLS-213 (Daikin Industries, Ltd.) was evenly sprayed and baked at 300° C. for one hour, completing a fluororesin-coated silicone rubber-made fixing belt having a thickness of 5 μm of the fluororesin layer.

This fixing belt was mounted in an electrophotographic copier which was continuously operated to produce 50,000 A4-size plain paper copies. Neither paper wrinkles or clogging took place. All the images copied were clear.

Comparative Example 8

A fixing belt was prepared as in Example 8 except that silicone rubber composition (CE2) of Comparative Example 2 was used instead of silicone rubber composition (EX1). This fixing belt was mounted in an electrophotographic copier which was continuously operated to produce A4-size plain paper copies. The image became vague after 10,000 copies. Paper wrinkled at 12,000th copy. The experimental run was interrupted at this point.

It is demonstrated that the silicone rubber compositions of the invention cure into products which have a high thermal conductivity, satisfactory heat resistance, and low compression set and are thus best suited as highly heat conductive silicone rubber coatings on fixing rolls and belts.

Japanese Patent Application No. 2005-341571 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat fixing roll comprising a roll shaft and at least one silicone rubber layer surrounding the outer periphery of the shaft, the silicone rubber layer being formed by curing a highly heat conductive silicone rubber composition comprising
   (A) 100 parts by weight of an organopolysiloxane having at least two silicon-bonded alkenyl radicals in a molecule,
   (B) 20 to 500 parts by weight of a metallic silicon powder having an average particle size of up to 100 μm, and
   (C) a sufficient amount for component (A) to cure of a curing agent.

2. The heat fixing roll of claim 1, wherein the metallic silicon powder (B) in the silicone rubber composition is a ground metallic silicon powder powdered by a grinding method to an average particle size of 1 to 50 μm.

3. The heat fixing roll of claim 1, wherein the metallic silicon powder (B) in the silicone rubber composition is a spherical metallic silicon powder having an average particle size of 1 to 50 μm.

4. The heat fixing roll of claim 1, wherein the silicone rubber composition has a thermal conductivity of at least 0.5 W/mK in the cured state.

5. A fixing roll comprising a roll shaft, at least one silicone rubber layer surrounding the outer periphery of the shaft, and a fluororesin or fluororubber layer surrounding the silicone rubber layer, the silicone rubber layer being formed by curing a highly heat conductive silicone rubber composition comprising
   (A) 100 parts by weight of an organopolysiloxane having at least two silicon-bonded alkenyl radicals in a molecule,
   (B) 20 to 500 parts by weight of a metallic silicon powder having an average particle size of up to 100 μm, and
   (C) a sufficient amount for component (A) to cure of a curing agent.

6. The heat fixing roll of claim 5, wherein the metallic silicon powder (B) in the silicone rubber composition is a ground metallic silicon powder powdered by a grinding method to an average particle size of 1 to 50 μm.

7. The heat fixing roll of claim 5, wherein the metallic silicon powder (B) in the silicone rubber composition is a spherical metallic silicon powder having an average particle size of 1 to 50 μm.

8. The heat fixing roll of claim 5, wherein the silicone rubber composition has a thermal conductivity of at least 0.5 W/mK in the cured state.

9. A fixing belt comprising a belt substrate, at least one silicone rubber layer disposed on the substrate, and optionally a fluororesin or fluororubber layer disposed on the silicone rubber layer, the silicone rubber layer being formed by curing a highly heat conductive silicone rubber composition comprising
   (A) 100 parts by weight of an organopolysiloxane having at least two silicon-bonded alkenyl radicals in a molecule,
   (B) 20 to 500 parts by weight of a metallic silicon powder having an average particle size of up to 100 μm, and
   (C) a sufficient amount for component (A) to cure of a curing agent.

10. The heat fixing belt of claim 9, wherein the metallic silicon powder (B) in the silicone rubber composition is a ground metallic silicon powder powdered by a grinding method to an average particle size of 1 to 50 μm.

11. The heat fixing belt of claim 9, wherein the metallic silicon powder (B) in the silicone rubber composition is a spherical metallic silicon powder having an average particle size of 1 to 50 μm.

12. The heat fixing belt of claim 9, wherein the silicone rubber composition has a thermal conductivity of at least 0.5 W/mK in the cured state.

* * * * *